(12) United States Patent
Tarvin et al.

(10) Patent No.: US 6,946,645 B2
(45) Date of Patent: Sep. 20, 2005

(54) MEASURING SYSTEM WITH SWEEPING COMB FILTER AND MULTIPLEXER

(75) Inventors: Jeffrey A. Tarvin, Brookfield, CT (US); Robert J. Schroeder, Newtown, CT (US); Rogerio T. Ramos, Chandlers Ford (GB); Tsutomu Yamate, Yokohama (JP)

(73) Assignee: Schlumberger Technology Corporation, Ridgefield, CT (US)

( * ) Notice: Subject to any disclaimer, the term of this patent is extended or adjusted under 35 U.S.C. 154(b) by 98 days.

(21) Appl. No.: 10/733,531

(22) Filed: Dec. 11, 2003

(65) Prior Publication Data

US 2004/0178330 A1 Sep. 16, 2004

Related U.S. Application Data

(63) Continuation-in-part of application No. 09/741,225, filed on Dec. 20, 2000, now abandoned.

(51) Int. Cl.[7] .............................................. G01B 11/16
(52) U.S. Cl. ............................ 250/227.14; 250/227.18
(58) Field of Search ....................... 250/227.14, 227.16, 250/227.18, 227.21, 227.23; 382/12, 13, 37; 356/32

(56) References Cited

U.S. PATENT DOCUMENTS

| | | | |
|---|---|---|---|
| 4,834,493 A | 5/1989 | Cahill et al. ................ 350/96.2 |
| 5,118,931 A | 6/1992 | Udd et al. ............. 250/227.16 |
| 5,397,891 A | * | 3/1995 | Udd et al. ............. 250/227.18 |
| 5,818,585 A | 10/1998 | Davis et al. ................ 356/345 |
| 5,828,059 A | 10/1998 | Udd ....................... 250/227.18 |
| 5,841,131 A | 11/1998 | Schroeder et al. ..... 250/227.17 |
| 6,115,121 A | 9/2000 | Erskine ....................... 356/345 |
| 6,380,534 B1 | 4/2002 | Farhadiroushan et al. ..................... 250/227.14 |
| 6,449,047 B1 | 9/2002 | Bao et al. ................... 356/478 |

OTHER PUBLICATIONS

Schroeder, Robert J. and Yamate, Tsutomu. *High Pressure and Temperature Sensing for the Oil Industry Using Fiber Bragg Gratings Written Onto Side Hole Single Mode Fiber.* Presented at 13th Int'l Conf. on Optical Fiber Sensors (Apr. 12–16, 1999).

* cited by examiner

*Primary Examiner*—Edward J. Glick
*Assistant Examiner*—Chih-Cheng Glen Kao
(74) *Attorney, Agent, or Firm*—John Lee; Jody Lynn DeStefanis; Dale Gaudier

(57) ABSTRACT

High-resolution measurement of a parameter is provided at multiple different locations simultaneously along an optic fiber. Light within a predefined range of wavelengths is transmitted into an optic fiber that contains multiple birefringent fiber optic pressure transducers, each including a Fiber Bragg Grating. Each grating defines a spatially modulated index of refraction and a wavelength that is unique within the system. A sweeping comb filter is used to apply optical comb filtering to light reflected from the transducers so as to pass filtered light having multiple spectral portions, each spectral portion associated with one transducer. The free spectral range of the sweeping comb filter is set to be approximately equal to the spectral range of a single spectral portion. Wavelength division multiplexing is applied to the filtered light so as to separate the spectral portions. The value of a parameter is preferably determined using the spectral spacing of two maxima of spectral intensity in each spectral portion.

17 Claims, 6 Drawing Sheets

US 6,946,645 B2

MEASURING SYSTEM WITH SWEEPING COMB FILTER AND MULTIPLEXER

This application is a continuation in part of co-owned, U.S. application Ser. No. 09/741,225, filed Dec. 20, 2000, now abandoned.

TECHNICAL FIELD

The present invention relates to apparatus and methods for measuring transverse strain and transverse strain gradients in mechanical structures, and for measuring formation parameters in earth formation around a borehole, including parameters such as pressure and temperature that may be derived from strain measurements.

BACKGROUND OF THE INVENTION

Pressure and temperature are important parameters to be determined in logging an oilfield earth formation. It is known that both can be measured using fiber optic grating based strain sensors.

Eric Udd, in U.S. Pat. No. 5,828,059 ("the Udd patent"), discloses a system and method to sense the application of transverse stress to an optic fiber having fiber optic gratings. The system includes a light source that produces a relatively wide spectrum light beam. The light beam is reflected or transmitted off of an optical grating in the core of an optical fiber that is transversely stressed either directly or by the exposure to pressure when the fiber is birefringent so that the optical fiber responds to the pressure to transversely stress its core. When transversely stressed, the optical grating produces a reflection or transmission from the light beam that has two peaks or minimums in its wavelength spectrum whose spacing and/or spread are indicative of the forces applied to the fiber. One or more detectors sense the reflection or transmissions from the optical grating to produce an output representative of the applied force. Multiple optical gratings and detectors may be employed to simultaneously to measure temperature or the forces at different locations along the fiber. U.S. Pat. No. 5,828,059 is hereby incorporated herein by reference.

Difficulties are encountered in applying the Udd method to measuring pressure in earth formation around a borehole. These difficulties arise mainly from the need to achieve very high resolution to distinguish between the two peaks.

The need to achieve very high resolution to distinguish between the two peaks is addressed by Robert Schroeder in U.S. Pat. No. 5,841,131 ("the Schroeder patent"). The Schroeder patent discloses a fiber optic pressure transducer having enhanced resolution and dynamic range. The Schroeder fiber optic pressure transducer includes a fiber optic core having one or more gratings written onto it, a birefringence structure for enhancing the birefringence of the core, and a structure for converting isotropic pressure forces to anisotropic forces on the fiber core. Schroeder also discloses a spectral demodulation system, including a Fabry-Perot interferometer, for detecting pressure ambient to the fiber optic pressure transducer based on the wavelength and shift of spectral peaks. U.S. Pat. No. 5,841,131 is hereby incorporated herein by reference. A pressure measuring system in accordance with the teachings of Udd and Schroeder is referred to herein below as "the Udd/Schroeder system".

It is very desirable, in an oilfield-logging context, to use a single pressure-measuring instrument to measure pressure simultaneously at multiple different locations. From this perspective, the Udd/Schroeder system has two related disadvantages as follows. When used to measure pressure simultaneously at twenty or more different locations, it has limited resolution. Alternatively, when configured for a particular resolution, the number of different locations that can be monitored simultaneously is severely limited. Other measuring systems that use multiple transducers to convert physical phenomena to optical wavelengths suffer from similar disadvantages.

SUMMARY OF THE INVENTION

The present invention provides a parameter measuring system that performs high-resolution measurement of the parameter simultaneously at multiple different locations along an optic fiber. A preferred embodiment of the system uses a Fabry-Perot Interferometer (FPI) as a sweeping comb filter to interrogate a linear array of birefringent fiber optic pressure transducers (each including a Fiber Bragg Grating, "FBG"), associates each pass band of the multiple pass bands of the comb filter with a specific one of the transducers, and uses a wavelength division multiplexer (WDM) to identify and separate the signals associated with the individual transducers. The invention achieves high resolution by configuring the sweeping comb filter to have a wavelength separation between adjacent pass bands that is significantly less than the spectral range of the reflected light from the multiple transducers. The preferred embodiment includes a broadband optic source coupled to at least one birefringence optic fiber with multiple spaced-apart transducers. The optic fiber is coupled to receive light from the broadband source. Each transducer is designed to reflect a different spectral portion of the received light. The birefringence optic fiber is structured to produce reflected light having two maximums of spectral intensity. The preferred embodiment further includes a sweeping comb filter coupled to receive light reflected from the transducers, and a wavelength division multiplexer coupled to receive filtered light from the interferometer. The sweeping comb filter is a Fabry-Perot Interferometer with a free spectral range approximately equal to the spectral range of the spectral portion of the received light reflected by a single FBG. The multiplexer has multiple output channels, each output channel associated with one FBG, and each output channel having a spectral range overlapping the spectral portion of its associated FBG. The multiplexer is configured to selectively transmit to each output channel reflected light from a transducer associated with that output channel. A processor is provided to receive light from the multiplexer output channels, and to calculate therefrom parameter values.

A second embodiment includes a plurality of birefringence optic fibers, each having at least one FBG. In a third embodiment, the sweeping comb filter is coupled to feed optical signals to the WDM (as in the first embodiment), but the WDM is coupled to feed optical signals to the processor via a sequencing distribution switch. In a fourth embodiment, the WDM is coupled to feed optical signals to the sweeping comb filter via a sequencing distribution switch, and the sweeping comb filter is coupled to feed optical signals to the processor. In a fifth embodiment, the light source is a tunable light source having a spectral range greater than the spectral range of two transducers and less than the spectral range of all of the transducers.

The present invention also provides a method for high-resolution measurement of a parameter simultaneously at multiple different locations along an optic fiber. A preferred embodiment of the method includes transmitting light of a predefined range of wavelengths into a birefringence optic fiber that contains multiple FBG's. (Each FBG defines a wavelength that is unique within the system). The method further includes using a Fabry-Perot Interferometer to apply optical comb filtering to light reflected from the transducers so as to pass filtered light having multiple spectral portions. It further includes setting the free spectral range of the Fabry-Perot Interferometer to be approximately equal to the spectral range of a single FBG. It further includes applying wavelength division multiplexing to the filtered light so as to separate the spectral portions, and using the spectral spacing of two maximums of spectral intensity in each spectral portion to determine the value of a parameter. In another embodiment, the instantaneous spectrum of a tunable light source encompasses a part of the full range of wavelengths defined by the multiple transducers. In a plurality of steps, the tunable light source excites a series of subsets of the multiple transducers, and a processor analyses the plurality of signals received from each transducer.

GENERAL

The present invention provides a parameter measuring system that performs high-resolution measurement of pressure simultaneously at multiple different locations along an optic fiber. The system includes a novel detector that allows simultaneous measurement of pressure at a larger number of different locations than is possible using the prior art, with improved resolution. The novel detector is used in conjunction with a light source and a birefringence fiber optic pressure sensor to detect the wavelength and shift of spectral peaks, thereby to determine ambient pressure. The fiber optic pressure sensor has a fiber optic core with at least one FBG written onto it, one FBG defining a fiber optic pressure transducer. An FBG is a section of an optical fiber with a spatially modulated index of refraction. The fiber optic core has a birefringence structure for enhancing the birefringence of the core, and a structure for converting isotropic pressure forces to anisotropic forces on the fiber core.

The preferred embodiment of the invention uses a Fabry-Perot Interferometer (FPI) as a sweeping comb filter to interrogate a linear array of birefringent fiber optic pressure transducers (each including a Fiber Bragg Grating), associates each pass band of the multiple pass bands of the comb filter with a specific one of the transducers, and uses a wavelength division multiplexer (WDM) to identify and separate the signals associated with the individual transducers. The invention achieves high resolution by configuring the sweeping comb filter to have a wavelength separation between adjacent pass bands that is significantly less than the spectral range of the reflected light from the multiple transducers. This ensures that resolution is not reduced as the number of transducers is increased.

Each transducer is tuned to a different wavelength, and each transducer wavelength is associated with a specific sweep range, or pass band, of the comb filter. Also, each sweep range of the comb filter is associated with a single channel of the wavelength division multiplexer (WDM).

When the FPI is scanned, the FPI transmits multiple signals simultaneously, each signal corresponding to a single pass band of the comb filter. Each FBG signal is transmitted in the spectral portion associated with the FBG. Thus, signals from all transducers are transmitted simultaneously through the period of the scan. This process produces a wavelength division multiplexed signal. A wavelength division multiplexer (WDM) identifies and separates the signals associated with the individual transducers.

The result is a system having a higher resolution than prior art systems for any given number of multiple transducers.

Figure 6:
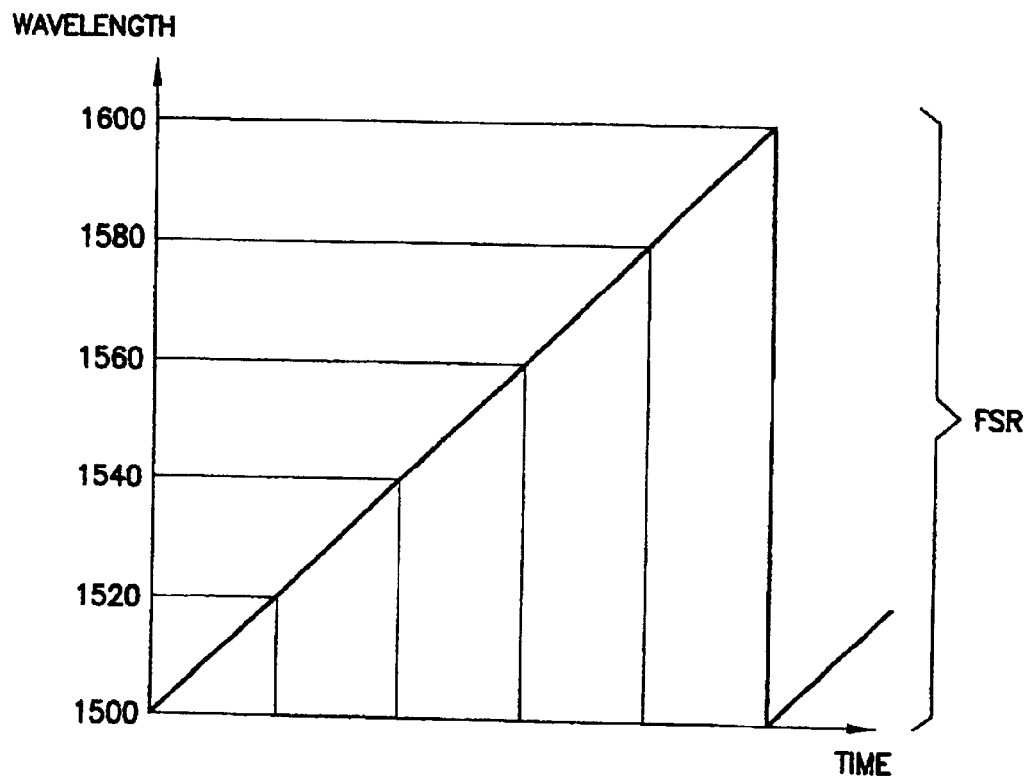
FIG. 6 (prior art) illustrates a single sweep of the Fabry-Perot Interferometer (FPI) of the Udd/Schroeder system, its FSR set to sweep over the concatenated central wavelength ranges of five transducers, sweeping from a wavelength of 1,500.0 nm to a wavelength of 1,600.0 nm.
Figure 7:
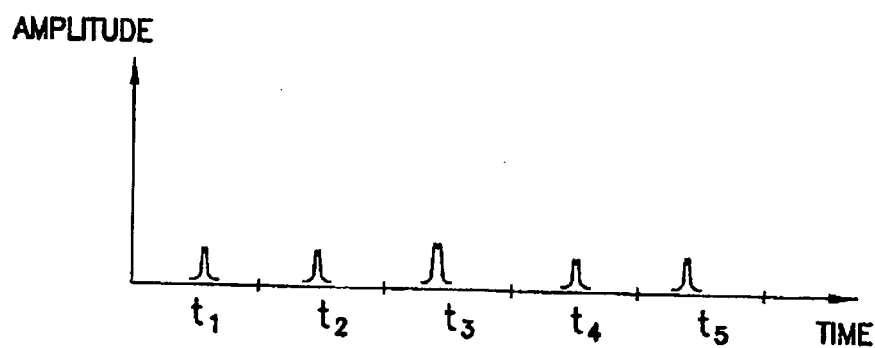
FIG. 7 shows the five time-separated twin-peak pulses produced by the FPI responsive to the sweep of FIG. 6.

One aspect of the prior art Udd/Schroeder system is that its spectral demodulation system includes a Fabry-Perot Interferometer that is required to both identify a specific transducer and to determine the spectral wavelength shift of that transducer. Because the interferometer is required to distinguish between the transducers, each having a different wavelength, it must be configured to have a free spectral range (sweep range) encompassing the range of wavelengths of all the transducers. This is illustrated in FIGS. 6A–6B (prior art). FIG. 6A shows the Udd/Schroeder Fabry-Perot Interferometer operating with a free spectral range of 100 nm. (1500 nm–1600 nm), a relatively broad band. Accordingly, when multiple transducers tuned to different wavelengths are used to simultaneously measure pressure at multiple different locations, resolution is sacrificed. The higher the number of different locations measured simultaneously, the lower the resolution.

Figure 4:
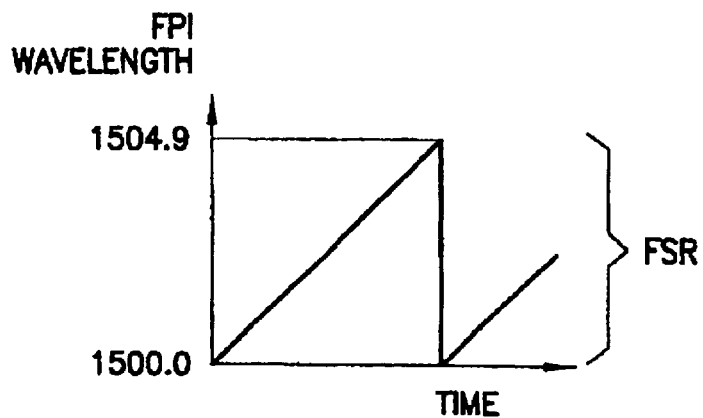
FIG. 4 illustrates a single sweep of the Fabry-Perot Interferometer (FPI), its free spectral range (FSR) set to sweep over the central wavelength range of a single transducer, sweeping from a wavelength of 1,500.0 nm to a wavelength of 1,504.9 nm.

The system of the present invention does not suffer from this deficiency because its detector includes a wavelength division multiplexer (WDM) which takes advantage of the "comb-filter" property of the Fabry Perot Interferometer to separate the signals from the several transducers. Having the WDM separate the signals allows the Fabry Perot Interferometer to be configured to have a free spectral range (sweep range) encompassing only the wavelength range of a single transducer. FIG. 4 shows the Fabry-Perot Interferometer operating with a free spectral range of 5 nm (1500 nm–1505 nm), a relatively narrow band. This greatly increases the resolution of the parameter measuring system.

First Preferred Embodiment

Figure 1:
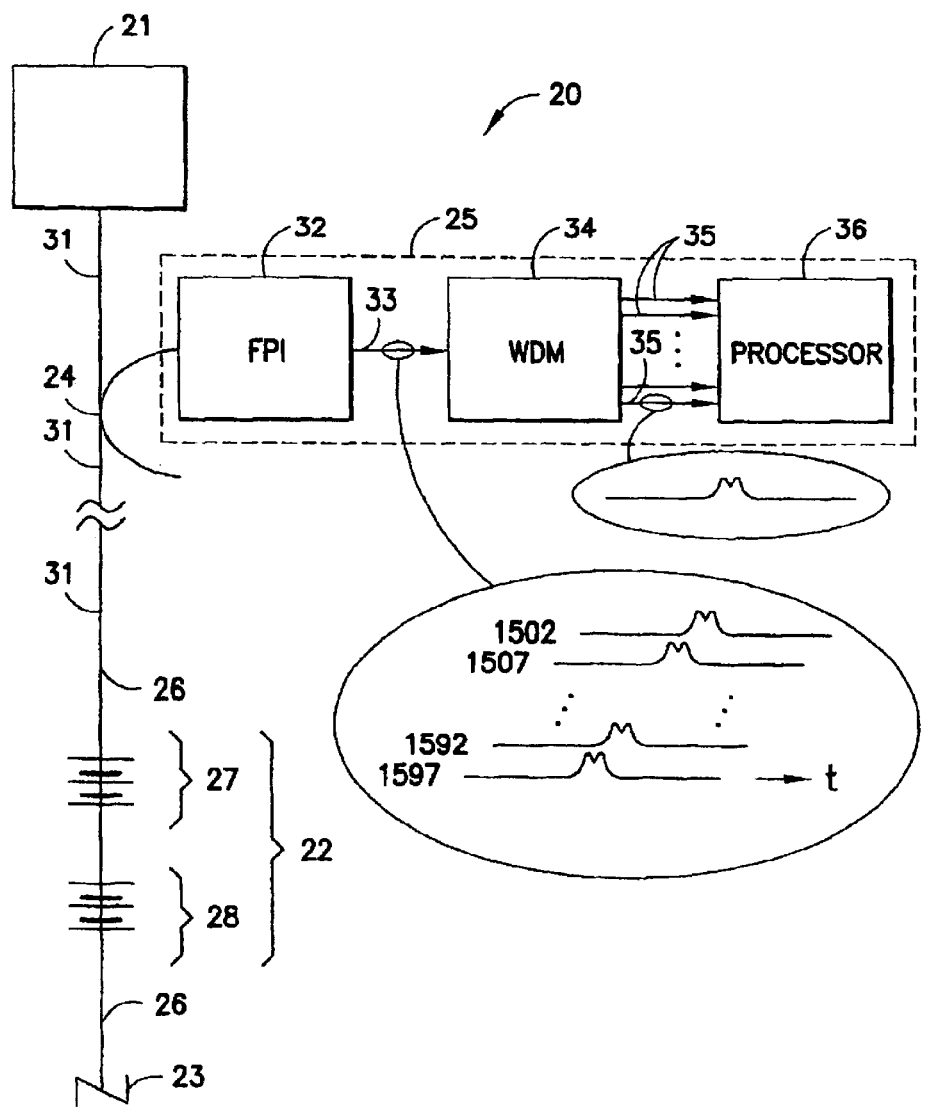
FIG. 1 is a schematic representation of a preferred embodiment of a parameter measuring system according to the present invention.

FIG. 1 is a schematic representation of a preferred embodiment of a parameter measuring system 20 according to the present invention. The system includes a broad-spectrum light source 21, a birefringent fiber optic pressure sensor 22, a low back reflection terminator 23, a beam splitter 24, and a detector 25. The detector includes a Fabry-Perot etalon spectral Interferometer (FPI) 32 functioning as a high-resolution sweeping comb filter and wavelength sensor, a wavelength division multiplexer (WDM) 34, and a processor 36.

Broad-spectrum light source 21 may be an LED, a tunable laser, or a laser diode. Fiber optic pressure sensor 22 includes a fiber optic core 26, and at least one birefringent fiber optic pressure transducer 27. Sensor 22 typically includes multiple birefringent fiber optic pressure transducers 27, 28, etc. Each transducer includes a grating tuned to a different wavelength. Light source 21 is sufficiently broad-spectrum to encompass the range of wavelengths defined by the multiple transducers.

Light source 21 directs a beam of light via fiber optic lead 31 through beam splitter 24 such that light enters one end of transducer 22, and passes through each of pressure transducers 27, 28, etc. Each pressure transducer reflects back a spectral portion of the light, the spectral portion reflected back being at the wavelength (or frequency) to which the transducer is tuned, and harmonics of that frequency. Beam splitter 24 directs the reflected beam into FPI 32. Preferably beam splitter 24 is a fiber beam splitter.

Figure 2:
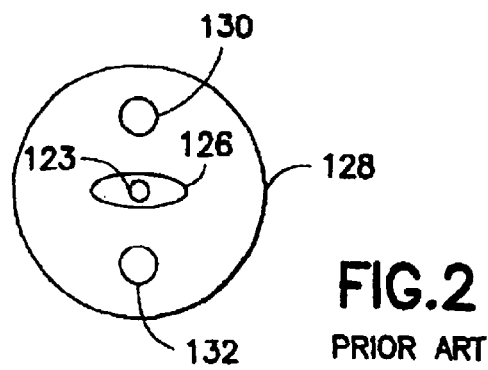
FIG. 2 is a cross section view of fiber optic core in the region of the grating.

In the preferred embodiment of FIG. 1, FPI 32 is a conventional Fabry-Perot etalon spectral interferometer used as a sweeping comb filter, and each grating is a Fiber Bragg Grating. Back reflection terminator 23 is an optic fiber terminator of the type disclosed in U.S. Pat. No. 4,834,493 to Cahill, et al. Fiber optic pressure sensor 22 includes twenty pressure transducers, tuned to wavelengths listed in Table 1. Twenty pass bands of FPI 32 are used, each having an optical pass band wavelength corresponding to the wavelength range of its associated transducer, as illustrated in Table 1. Fiber optic pressure transducers 27, 28, etc., are constructed as described in U.S. Pat. No. 5,841,131 to Schroeder et al. FIG. 2 (prior art) is a cross section view of fiber optic core 26 in the region of the grating. Fiber optic core 26 includes core 123, first cladding 126, second cladding 128, first side hole 130, and second side hole 132.

FIG. 1 shows FPI 32, operating as a sweeping comb filter, having a single channel output 33 carrying twenty optical signals simultaneously, each signal having the wavelength of its corresponding transducer. Each signal contains the two spectral peaks of the wave reflected from one of the birefringent fiber optic pressure transducers 27, 28, etc. The change in wavelength interval between the two peaks is indicative of pressure, the parameter to be measured. The twenty superimposed twin-peak pulses produced by the FPI, have center wavelengths of approximately 1502 nm, 1507 nm, etc., as shown in FIG. 1, and as listed in Table 1.

Wavelength division multiplexer (WDM) 34 multiplexes the superimposed twin-peak pulses of different wavelengths received from the FPI onto twenty output channels 35 for input to processor 36. For each pressure transducer, the processor uses the signals received via the appropriate one of the twenty output channels 35 to determine the wavelength interval between the two peaks, and from this to calculate pressure.

Figure 5A:
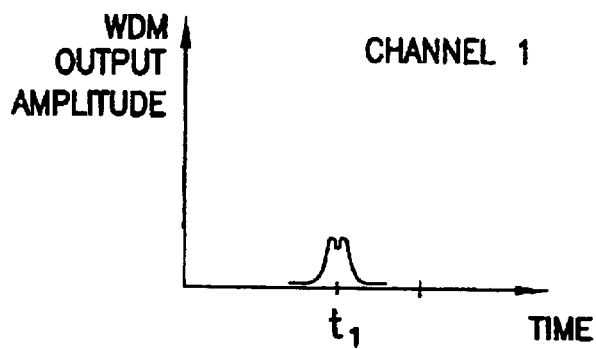
FIGS. 5A and 5B show the output from channel 1 and channel 20, respectively, of the wavelength division multiplexer (VVDM) produced by the sweep of FIG. 4.
Figure 5B:
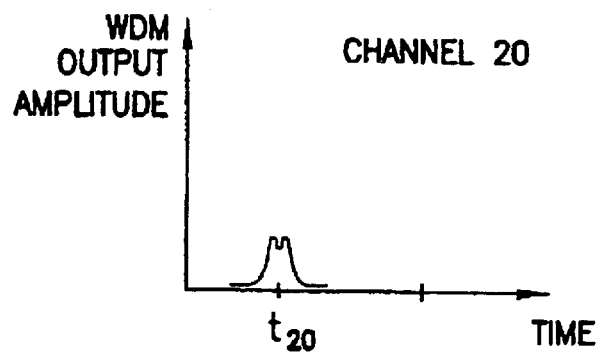

FIG. 4 illustrates one sweep of the FPI, in a single sweep period of approximately 10 milliseconds, from 1500.0 nm to 1504.9 nm, the sweep allowing transmission in a moving narrow band approximately 0.025 nm wide. The free spectral range of the FPI is the range 1500.0 nm to 1504.9 nm. In the same sweep period, the FPI also sweeps between 1505.0 nm and 1509.9 nm; between 1510.0 nm and 1514.9 nm; etc., to produce twin-peak outputs in all twenty output channels of the WDM. The outputs are shown for channel 1 and channel 20, respectively, in FIGS. 5A and 5B.

Table 1 shows all channels as having equal transmission sweep ranges expressed in wavelengths. This is simply a design convenience. The spacing of the sweeping comb filter transmission windows are equally spaced in frequency, and frequency is the inverse of wavelength, so the spacing expressed in wavelengths of the sweeping comb filter transmission windows differ slightly.

Second Embodiment

Figure 3:
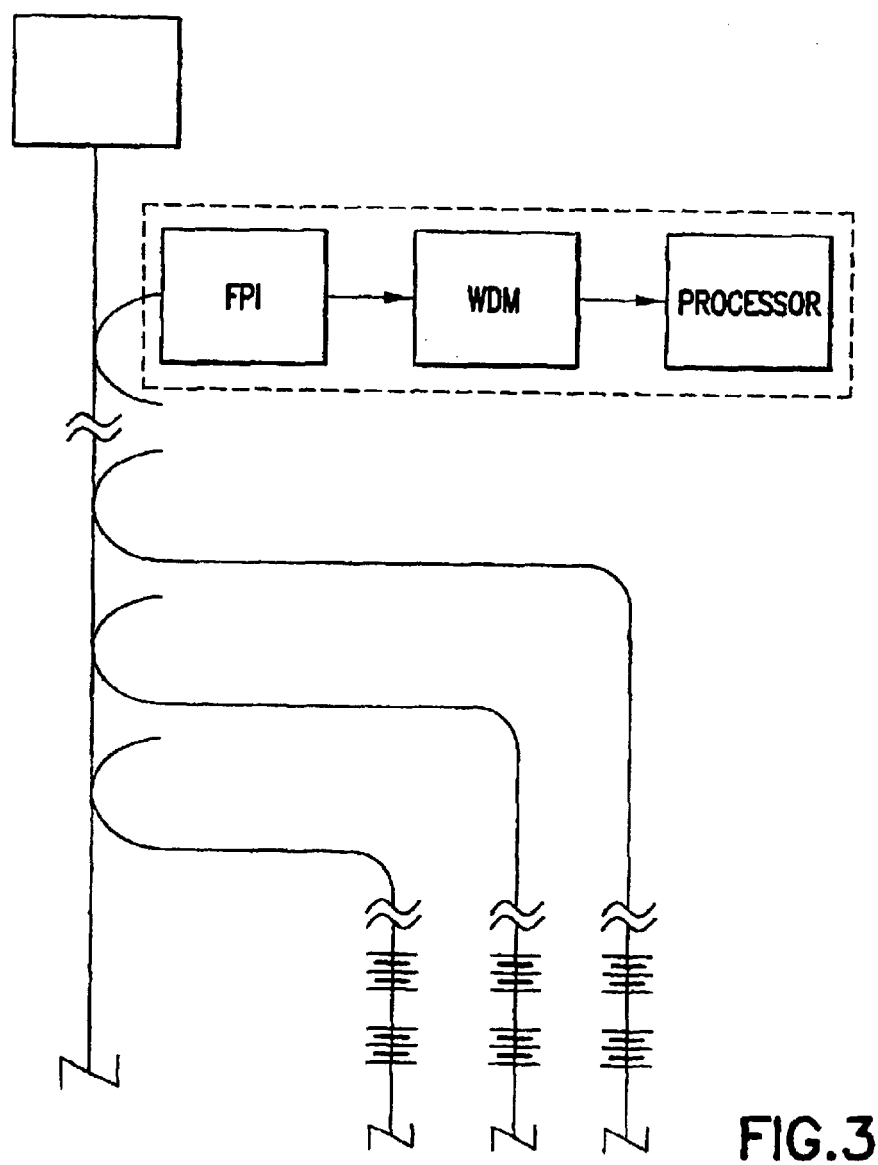
FIG. 3 is a schematic representation of an alternative embodiment of the parameter measuring system.

FIG. 3 is a schematic representation of a second embodiment of the parameter measuring system. This second embodiment is configured for measuring parameters in multiple boreholes, using multiple birefringent fiber optic pressure transducers, each transducer coupled via a fiber optic core and a beam splitter to the fiber optic lead. Each fiber optic core includes at least one transducer. Each transducer is tuned to a different wavelength.

Third Embodiment

Figure 8:
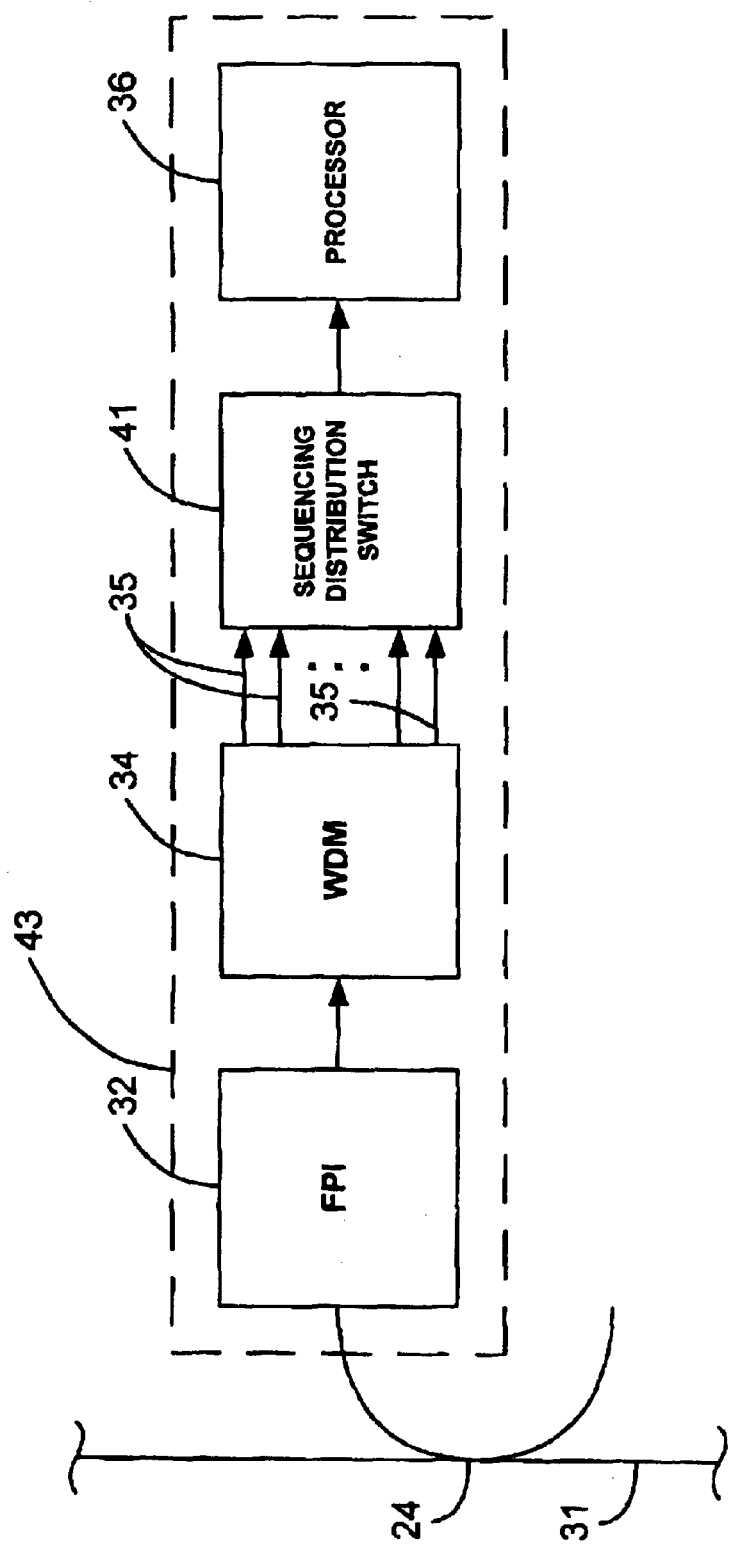
FIG. 8 is a schematic representation of the detector of the third embodiment of the invention.

A third embodiment (FIG. 8) includes all the elements of the first embodiment (FIG. 1) plus a sequencing distribution switch at the output of the WDM. FIG. 8 is a schematic representation of detector 43 of a third embodiment of the invention. FIG. 8 shows the third embodiment having a Fabry-Perot Interferometer (FPI) 32 operating as a sweeping comb filter. FPI 32 (operating as a sweeping comb filter) is coupled to receive optical signals from the transducers (not shown), and to feed output signals to wavelength division multiplexer (WDM) 34. The output of WDM 34 is coupled to feed processor 36 via optical sequencing distribution switch 41.

Fourth Embodiment

Figure 9:
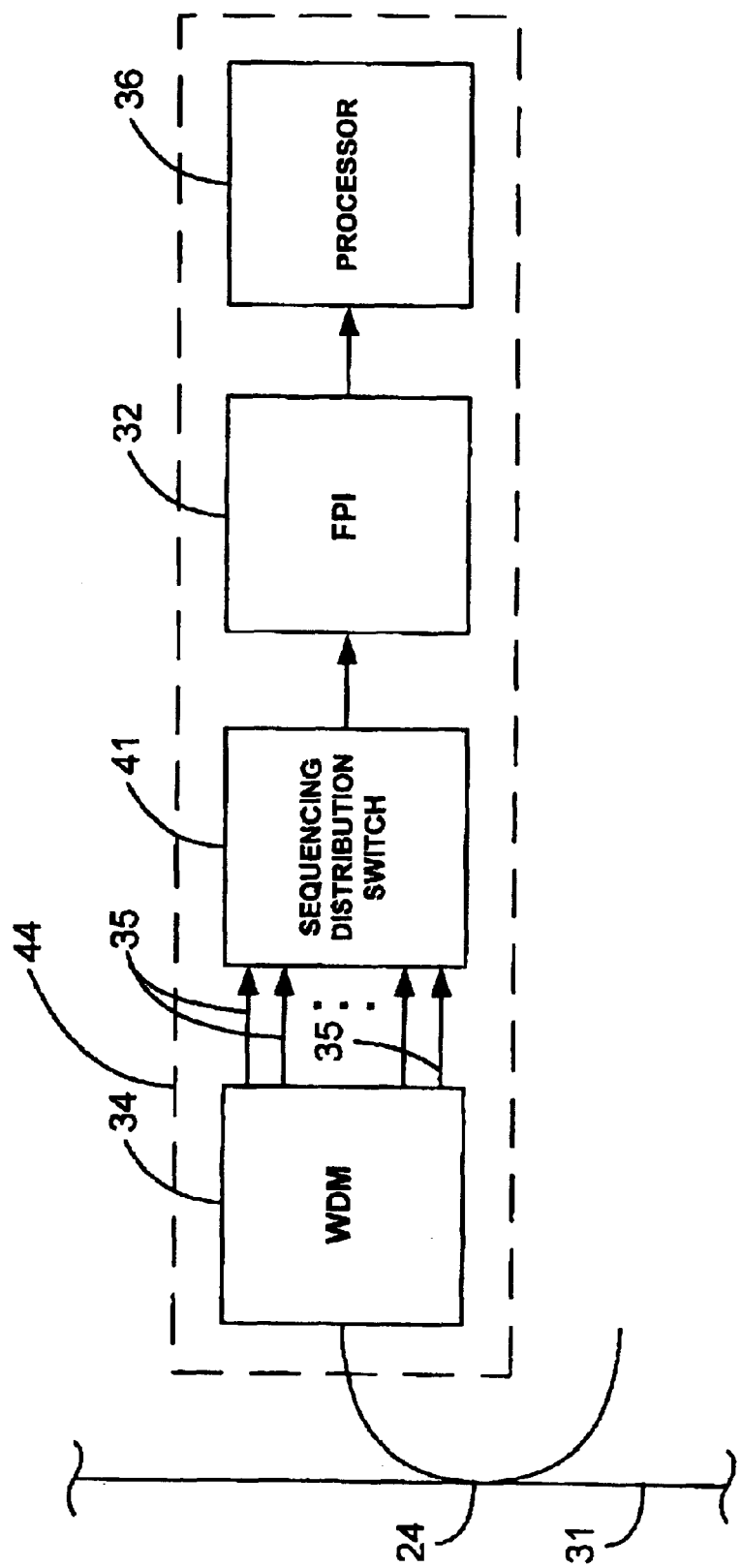
FIG. 9 is a schematic representation of the detector of a fourth embodiment of the invention.

A fourth embodiment (FIG. 9) includes all the elements shown in FIG. 8, but with the elements in a different sequence. The WDM is coupled to receive optical signals from the transducers, and the sweeping comb filter is coupled to receive optical signals from the WDM via the sequencing distribution switch. In contrast to the first and third embodiments shown in FIGS. 1 and 8, FIG. 9 shows detector 44 having WDM 34 coupled to receive optical signals from the transducers, and FPI 32 (operating as a sweeping comb filter) is coupled to receive optical signals from WDM 34 via sequencing distribution switch 41.

Fifth Embodiment

A fifth embodiment (not illustrated) includes all the elements shown in FIG. 1 or FIG. 8, wherein the light source is a tunable light source having an instantaneous spectrum narrower than the range of wavelengths defined by the multiple transducers. The width of the instantaneous spectrum may be less than, equal to or greater than the range of wavelengths defined by the multiple transducers. Preferably, the tunable light source is a tunable laser.

In a first step, the instantaneous spectrum of the tunable light source encompasses a first part of the full range of wavelengths defined by the multiple transducers. During this first step, the processor analyses signals received from all transducers excited by the instantaneous spectrum. In a second step, the instantaneous spectrum of the tunable light source encompasses a second part of the full range of wavelengths defined by the multiple transducers. During this second step, the processor analyses signals received from all transducers excited by the instantaneous spectrum.

Thus, in a first step, the tunable light source excites a first subset of the multiple transducers, and in a second step, the tunable light source excites a second subset of the multiple transducers. For each transducer excited in a plurality of steps, the processor combines information from the plurality of steps.

In this fifth embodiment, the instantaneous spectrum of a tunable light source encompasses a part of the full range of wavelengths defined by the multiple transducers. In a plurality of steps, the tunable light source excites a series of subsets of the multiple transducers, and a processor analyses the plurality of signals received from each transducer.

TABLE 1

| FBG Twenty FBG Transducers FBG Transducer No. | FBG Reflected Beam Wavelength Nanometers (Approx.) | FPI One Sweep over Free Spectral Range (FRS) (FRS = 5 nm) Simultaneous Transmission Sweep Ranges | WDM Twenty WDM Output Channels WDM Channel No. | WDM Channel Bandwidth WDM Channel Transmission Bandwidth |
|---|---|---|---|---|
| 1 | 1502.5 | 1500.0–1504.9 | 1 | 1500.0–1505.0 |
| 2 | 1507.5 | 1505.0–1509.9 | 2 | 1505.0–1510.0 |
| 3 | 1512.5 | 1510.0–1514.9 | 3 | 1510.0–1515.0 |
| 4 | 1517.5 | 1515.0–1519.9 | 4 | 1515.0–1520.0 |
| 5 | 1522.5 | 1520.0–1524.9 | 5 | 1520.0–1525.0 |
| 6 | 1527.5 | 1525.0–1529.9 | 6 | 1525.0–1530.0 |
| 7 | 1532.5 | 1530.0–1534.9 | 7 | 1530.0–1535.0 |
| 8 | 1537.5 | 1535.0–1539.9 | 8 | 1535.0–1540.0 |
| 9 | 1542.5 | 1540.0–1544.9 | 9 | 1540.0–1545.0 |
| 10 | 1547.5 | 1545.0–1549.9 | 10 | 1545.0–1550.0 |
| 11 | 1552.5 | 1550.0–1554.9 | 11 | 1550.0–1555.0 |
| 12 | 1557.5 | 1555.0–1559.9 | 12 | 1555.0–1560.0 |
| 13 | 1562.5 | 1560.0–1564.9 | 13 | 1560.0–1565.0 |
| 14 | 1567.5 | 1565.0–1569.9 | 14 | 1565.0–1570.0 |
| 15 | 1572.5 | 1570.0–1574.9 | 15 | 1570.0–1575.0 |
| 16 | 1577.5 | 1575.0–1579.9 | 16 | 1575.0–1580.0 |
| 17 | 1582.5 | 1580.0–1584.9 | 17 | 1580.0–1585.0 |
| 18 | 1587.5 | 1585.0–1589.9 | 18 | 1585.0–1590.0 |
| 19 | 1592.5 | 1590.0–1594.9 | 19 | 1590.0–1595.0 |
| 20 | 1597.5 | 1595.0–1599.9 | 20 | 1595.0–1600.0 |

What is claimed is:

1. A system for measuring values of a parameter at multiple locations, comprising:

multiple transducers at spaced-apart multiple locations, each transducer optically coupled to receive light from a source of light, each transducer designed to reflect received light as reflected light indicative of a local value of the parameter, each transducer producing reflected light in a different spectral portion of the received light;

a sweeping comb filter coupled to receive reflected light from the transducers; and a wavelength division multiplexer coupled to receive reflected light from multiple transducers;

wherein the sweeping comb filter and the wavelength division multiplexer are coupled together to receive and operate on reflected light from the transducers; and wherein the sweeping comb filter has a wavelength separation between adjacent pass bands that is significantly less than the spectral range of the reflected light from the multiple transducers.

2. A system according to claim 1, wherein each transducer includes a grating.

3. A system according to claim 2, wherein the grating is a Fiber Bragg Grating.

4. A system according to claim 1, wherein each transducer is structured to produce reflected light having an optical wavelength indicative of a local value of the parameter.

5. A system according to claim 1, wherein each transducer is structured to produce reflected light having two maxima of spectral intensity indicative of a local value of the parameter.

6. A system according to claim 1, wherein the sweeping comb filter is a Fabry-Perot interferometer.

7. A system according to claim 6, wherein the Fabry-Perot interferometer has a free spectral range approximately equal to the spectral range of the reflected light from a single transducer.

8. A system according to claim 1, wherein the wavelength division multiplexer includes multiple output channels, each output channel associated with a transducer.

9. A system according to claim 8, further comprising a processor, coupled to receive light from the output channels, for calculating parameter values.

10. A system according to claim 1, wherein the sweeping comb filter is coupled to receive optical signals from the transducers, and is coupled to feed optical signals to the wavelength division multiplexer.

11. A system according to claim 10, further comprising a sequencing distribution switch coupled between the wavelength division multiplexer and a processor.

12. A system according to claim 1, further comprising a sequencing distribution switch, wherein the wavelength division multiplexer is coupled to receive optical signals from the transducers, and is coupled to feed optical signals to the sweeping comb filter via the sequencing distribution switch.

13. A system according to claim 1, wherein the light source is a tunable light source having an instantaneous spectrum narrower than the range of wavelengths defined by the multiple transducers.

14. A method for measuring a value of a parameter at multiple locations, the method comprising:

a) transmitting light of a predefined range of wavelengths into an optic fiber system with multiple transducers, each transducer defining a spatially modulated index of refraction and defining a wavelength that is unique within the system;

b) applying optical comb filtering to light reflected from the transducers to pass reflected light having multiple spectral portions, the spectral portions having wavelength separation that is significantly less than the spectral range of the wavelengths from the multiple transducers;

c) applying wavelength division multiplexing to the reflected light so as to separate the spectral portions; and d) using a spectral portion to determine the value of a parameter.

15. A method according to claim 14, wherein optical comb filtering involves using a Fabry-Perot Interferometer.

16. A method according to claim 15, further comprising:

e) setting a free spectral range of the Fabry-Perot Interferometer to be approximately equal to the spectral range of a single transducer.

17. A method according to claim 14, further comprising, setting an instantaneous spectrum of a tunable light source to excite a series of subsets of the multiple transducers in a plurality of steps, and analyzing a plurality of signals received from each transducer.

* * * * *